United States Patent
Miller

(10) Patent No.: US 7,550,965 B2
(45) Date of Patent: Jun. 23, 2009

(54) ANGULAR POSITION MEASUREMENT DEVICE

(75) Inventor: Kirk A. Miller, Plano, TX (US)

(73) Assignee: Raytheon Company, Waltham, MA (US)

(*) Notice: Subject to any disclaimer, the term of this patent is extended or adjusted under 35 U.S.C. 154(b) by 204 days.

(21) Appl. No.: 11/559,597

(22) Filed: Nov. 14, 2006

(65) Prior Publication Data
US 2008/0111541 A1 May 15, 2008

(51) Int. Cl.
  G01B 7/30 (2006.01)
  G01R 35/00 (2006.01)
(52) U.S. Cl. .................. 324/207.25; 324/202
(58) Field of Classification Search .......... 324/202, 324/207.12, 207.15, 207.16, 207.17, 207.2, 324/207.21, 207.22, 207.23, 207.25; 702/150, 702/151; 250/231.13, 231.14, 231.18
See application file for complete search history.

(56) References Cited

U.S. PATENT DOCUMENTS

| 6,707,291 | B2 * | 3/2004 | Goto et al. ............ 324/207.16 |
| 7,301,333 | B2 * | 11/2007 | Kuwahara ............. 324/207.25 |
| 7,401,001 | B2 * | 7/2008 | Stek et al. ................ 702/150 |
| 2002/0130657 | A1 | 9/2002 | Li ........................ 324/207.21 |
| 2005/0007104 | A1 | 1/2005 | Lequesne et al. ....... 324/207.25 |

FOREIGN PATENT DOCUMENTS

| CZ | CH 571 703 | 1/1976 |
| DE | 3641131 A1 | 6/1988 |
| DE | 199 08 091 A1 | 8/2000 |
| DE | 103 31 613 A1 | 1/2005 |
| EP | 1 600 737 A2 | 5/2005 |
| EP | 1 538 422 A1 | 6/2005 |
| FR | 2 644 240 | 9/1990 |

OTHER PUBLICATIONS

Notification of Transmittal of the International Search Report and the Written Opinion of the International Searching Authority, or the Declaration; PCT/US07/081729;ISA/EP; 13 pages.

* cited by examiner

Primary Examiner—Kenneth J Whittington
(74) Attorney, Agent, or Firm—Baker Botts L.L.P.

(57) ABSTRACT

In one embodiment, a sensor assembly for measuring an angular position of a rotatable structure includes an annular ring that is eccentrically rotatable about an axis, a first and second sensors, and an sensor transducing circuit for combining the respective output levels from the two sensors. The first and second sensors are rotatable relative to the annular ring and disposed a predetermined distance from the axis such that the first and second sensors have a first and second output level respectively that is proportional to the angular position of the annular ring. The sensor transducing circuit is operable to proportionally combine the first and second output levels into an output signal based upon a weighting factor, the weighting factor being proportional to angular position of at least one of the first and second sensors.

19 Claims, 6 Drawing Sheets

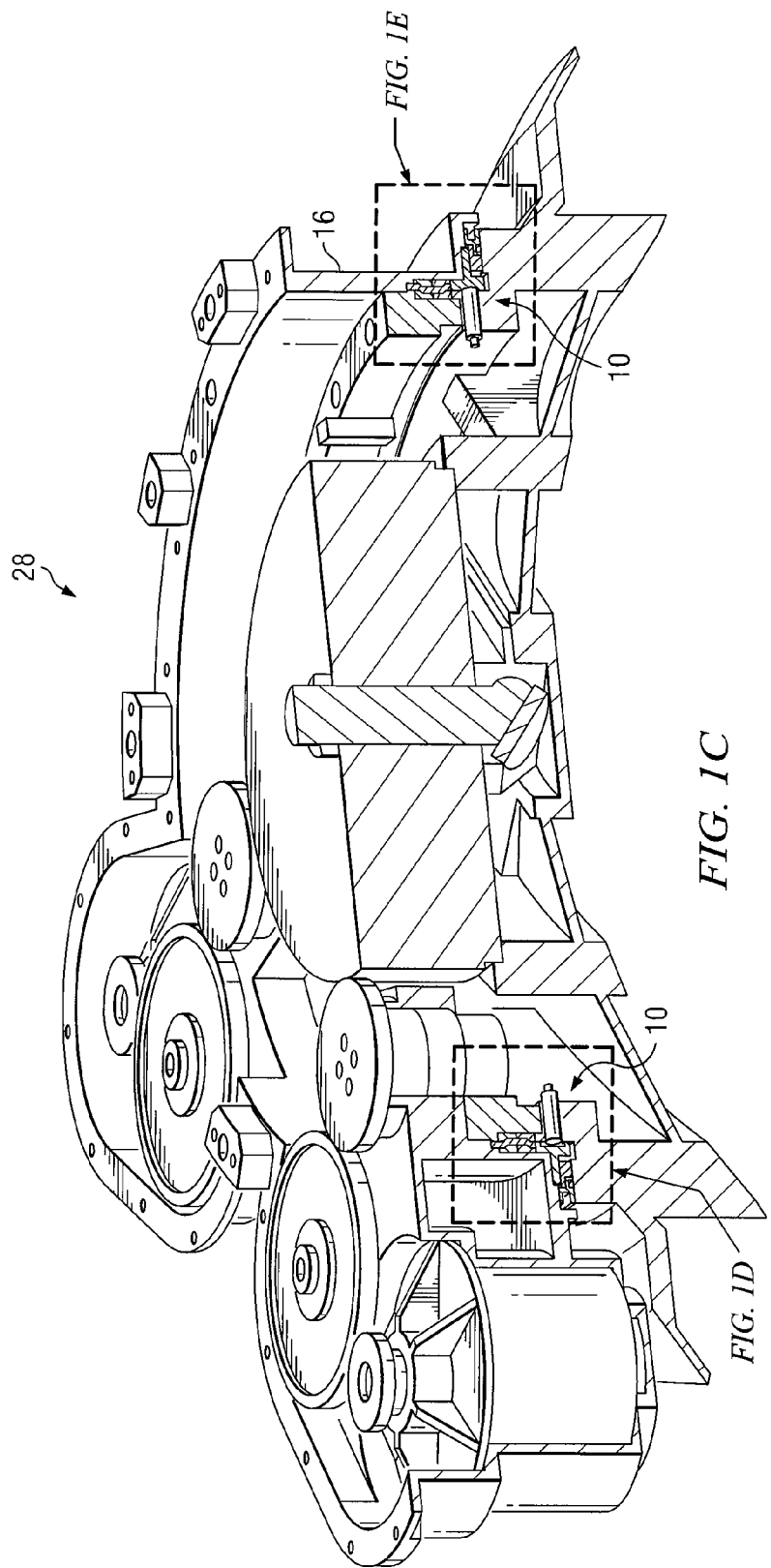

an annular ring is generally smooth in contour. In this manner, no discontinuous spikes, or glitches are outputted by the sensors as the shaft rotates about its axis. Additionally, the weighting factor may be essentially continuous throughout the rotational range of the annular ring. In this manner, no step function may be applied as the shaft rotates into or out of a particular range of travel. Other technical advantages will be readily apparent to one skilled in the art from the following figures, description and claims.

ANGULAR POSITION MEASUREMENT DEVICE

TECHNICAL FIELD OF THE INVENTION

This invention generally relates to measurement devices, and more particularly, to an angular position measurement device and method of operating the same.

BACKGROUND OF THE INVENTION

Many types of rotatable structures, such as motors, gimbal joints, hinges, and the like have a rotating shaft. In some instances, it has been desirable to measure the angular position of the shaft at various times during its operation. A gimbal is one type of rotatable structure that provides for rotation of an object in three dimensions. Objects such as cameras or other visual aid devices have been implemented on gimbals to enable rotation of the camera's eyepiece to virtually any geometrical orientation. One such type of visual aid device is an electro optical/infrared (EO/IR) sensor. The electro optical/infrared sensor is a type of camera that is capable of taking pictures using both the visible and infrared portions of the electromagnetic spectrum. When mounted onto a gimbal, the electro optical/infrared sensor is capable of deriving images from virtually any orientation.

SUMMARY OF THE INVENTION

In one embodiment, a sensor assembly for measuring an angular position of a rotatable structure includes an annular ring that is eccentrically rotatable about an axis, a first and second sensors, and a sensor transducing circuit to combine the measurements from the two sensors. The first and second sensors are rotatable relative to the annular ring and disposed a predetermined distance from the axis such that the first and second sensors have a first and second output level respectively that is proportional to the angular position of the annular ring. The sensor transducing circuit is operable to proportionally combine the first and second output levels into an output signal based upon a weighting factor, the weighting factor being proportional to the angular position of at least one of the first and second sensors.

In another embodiment, a method for measuring the angular position of a rotatable structure includes rotating an annular ring that is eccentrically coupled to an axis, measuring a first output level and a second output level from a first and second sensors respectively, and combining the first and second output levels using a weighting factor. The first and second sensors are disposed at a predetermined angular distance from one another such that the resulting waveform produced by each sensor is out of phase with one another as the shaft rotates about the axis. The first and second sensors are combined using a weighting factor in which the output level of the second sensor is more heavily weighted as the output level of the first sensor approaches a relative peak value.

Depending on the specific features implemented, particular embodiments of the present invention may exhibit some, none, or all of the following technical advantages. Various embodiments may be capable of providing two or more sensors that do not make contact with any portion of the shaft. By placement of these sensors in a generally perpendicular relation to each other around the axis of the shaft, a weighting factor may be applied to combine the outputs of each such that relatively accurate measurements may be taken over a continuous angular displacement of the shaft. Certain embodiments may provide other advantages such as implementation of a angular position measurement device that does not create any discontinuities in the output signal. For instance, the sensing surface that may be the inner or outer surface of an annular ring is generally smooth in contour. In this manner, no discontinuous spikes, or glitches are outputted by the sensors as the shaft rotates about its axis. Additionally, the weighting factor may be essentially continuous throughout the rotational range of the annular ring. In this manner, no step function may be applied as the shaft rotates into or out of a particular range of travel. Other technical advantages will be readily apparent to one skilled in the art from the following figures, description and claims.

BRIEF DESCRIPTION OF THE DRAWINGS

A more complete understanding of embodiments of the invention will be apparent from the detailed description taken in conjunction with the accompanying drawings in which:

FIG. 1C is a partial perspective view of the angular position measurement device of FIG. 1A that is configured on one embodiment of a rotatable structure that is an electro optical/infrared sensor;

DETAILED DESCRIPTION OF EXAMPLE EMBODIMENTS OF THE INVENTION

Figure 1A:
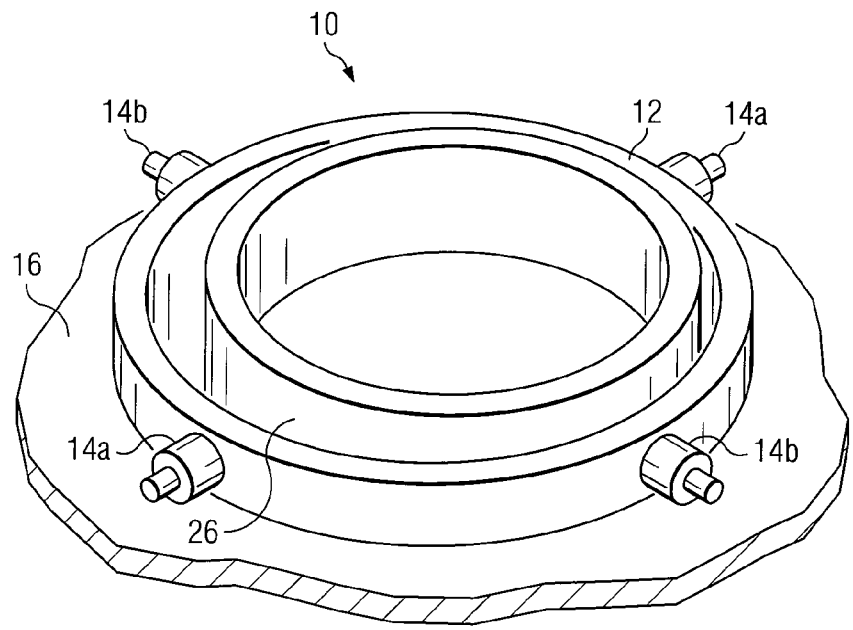
FIG. 1A is a partial perspective view of a rotatable structure and an angular position measurement device according to the teachings of the invention disposed on the rotatable structure.

Reference will now be made to the drawings in which various embodiments of an angular position measurement device 10 are shown and described. Specifically as shown in FIG. 1A, one embodiment of an angular position measurement device 10 is shown having an annular ring 12 and two pairs of sensors 14a and 14b. The sensors 14 may be affixed to any suitable rotatable structure 16 that is adapted to support a shaft (not explicitly shown). The shaft in turn, is coupled to the annular ring 12 such that rotation of the shaft relative to the rotatable structure 16 causes a corresponding rotation of the annular ring 12 relative to the sensors 14. The annular ring 12 has an outer surface 26 that is generally smooth in contour in one embodiment, for reasons to be described below.

Figure 1B:
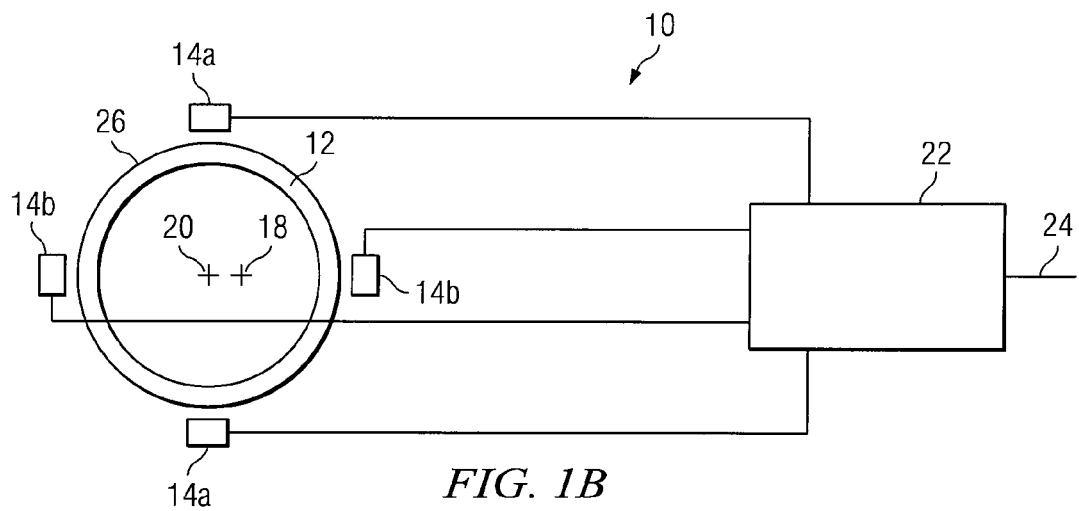
FIG. 1B is a schematic diagram of the embodiment of FIG. 1A showing additional details of a sensor transducing circuit that is electrically coupled to the sensors.

FIG. 1B shows a schematic diagram view of the angular position measurement device 10. As shown, the annular ring 12 is eccentrically coupled about a shaft axis 18. That is, the center 20 of the annular ring 12 is displaced from the shaft axis 18 such that rotation about the shaft axis 18 causes a proportional change in distance of the outer surface 26 from each of the sensors 14a and 14b. The sensors 14a and 14b are configured to measure this distance and output a signal to an sensor transducing circuit 22. The sensor transducing circuit 22 is configured to combine the measured signals from each of the sensors 14a and 14b into a single output signal 24 that accurately indicates the angular position of the annular ring 12 relative to the rotatable structure 16. In one embodiment, the sensors 14a and 14b are adapted to not make contact the annular ring 12. In this manner, an optical path may be maintained through the center of the annular ring 12.

Figure 1D:
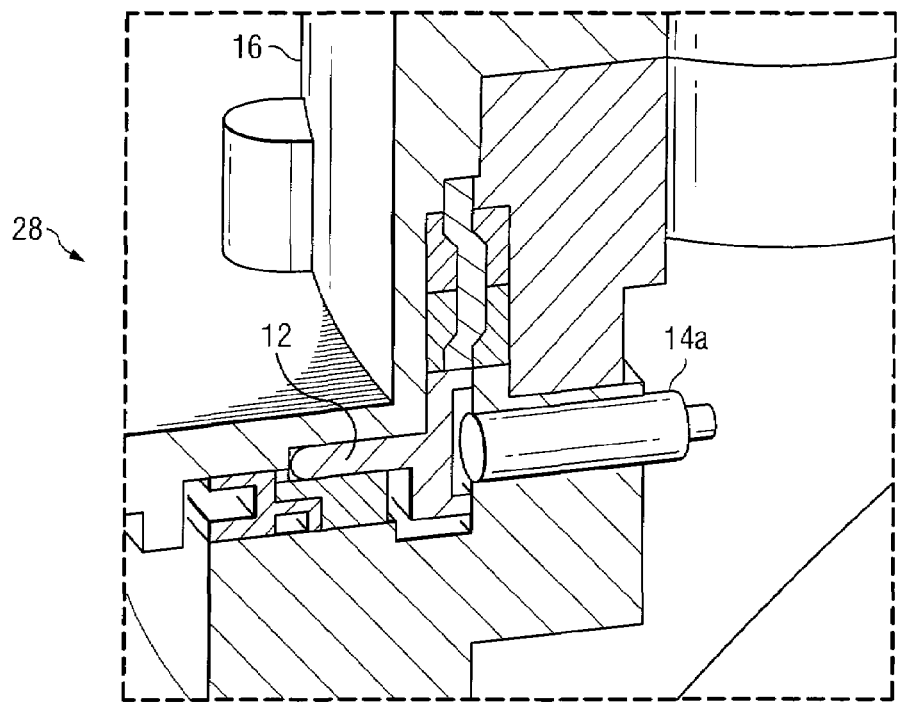
FIG. 1D is an enlarged partial perspective view of one sensor that is configured on the electro optical/infrared sensor of FIG. 1C.
Figure 1E:
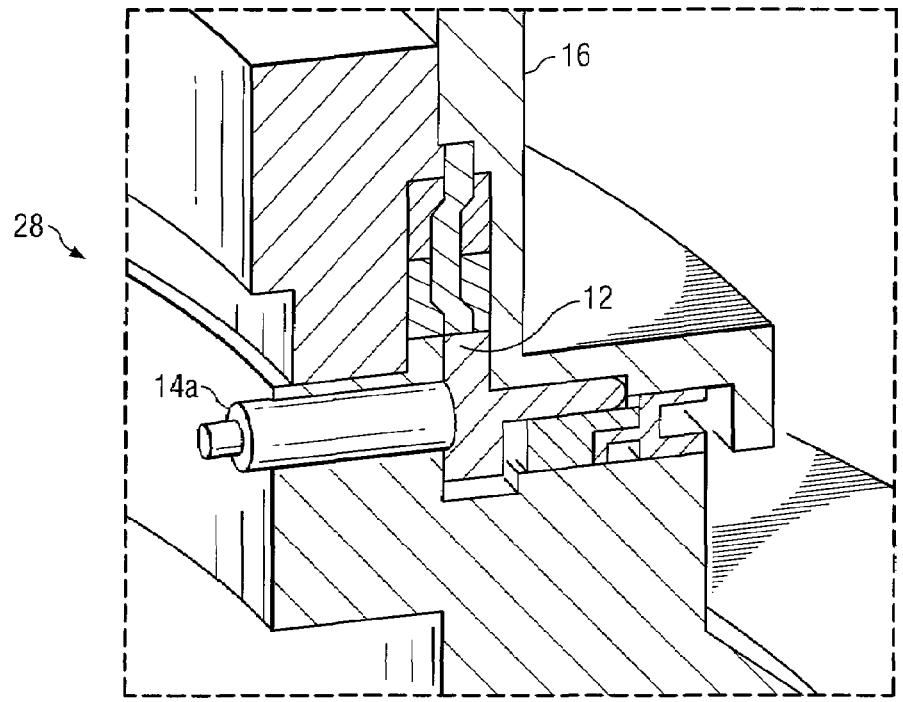
FIG. 1E is an enlarged partial perspective view of another sensor that is configured on the electro optical/infrared sensor of FIG. 1C.

The angular position measurement device 10 may be implemented on any suitable structure that has a rotatable shaft. FIG. 1C shows one embodiment of an angular position measurement device 10 that is configured as an electro optical/infrared sensor 28. As shown, the electro optical/infrared sensor 28 has a rotatable structure 16 that in this particular embodiment is a gimbal assembly. FIGS. 1D and 1E show enlarged partial views of the one pair of sensors 14a and associated annular ring 12. In this particular embodiment, the rotatable structure 16 as shown is suited for implementation on the azimuthal axis of the electro optical/infrared sensor 28.

In one embodiment, the outer surface 26 of the annular ring 12 has an essentially smooth contour. That is, there are no significant notches, slots, or other discontinuous surface features on the outer surface 26. In this manner, the resulting output signal from either sensor 14a or 14b may be free of glitches, spikes, or other discontinuous type signals as the shaft rotates. Thus, the angular position measurement device 10 may provide relatively accurate angular position measurements at each point throughout the rotational range of the shaft.

Measurements of the angular position of the annular ring 12 may be provided by at least two sensors that are disposed a predetermined angular distance from one another around the shaft axis 18. In one embodiment, the two sensors 14a and 14b are displaced from one another at an angle of approximately 90 degrees. In another embodiment, each of the two sensors may be a pair of sensors 14a and 14b such that four sensors are used. Thus as shown in FIG. 1B, two pairs of sensors 14a and 14b are provided to convey angular position information from the annular ring 12 to the sensor transducing circuit 18. Sensors 14a and 14b may be any suitable type of sensor, such as, for example, an eddy current sensor. Sensors 14a and 14b both comprise two sensors that are oppositely positioned around the shaft axis 12 such that they are generally 180 degrees apart with relation to the shaft axis 18. Providing two sensors 14 180 degrees apart allows differential measurements to be taken that may serve the purpose of canceling common mode noise within the measurement device.

In this particular embodiment, each pair of sensors 14a or 14b are generally perpendicular to one another. That is, a first pair of sensors 14a may be positioned around the shaft axis 18 such that they are generally 90 degrees apart with relation to the other pair of sensors 14b. Thus, certain embodiments of the present invention may provide enhanced accuracy for measurements that are taken by angular position measurement device 10. Each pair of sensors 14a and 14b may be operable to output an output level indicative of the relative distance of each pair of sensors 14a or 14b from the annular ring 12.

In the particular embodiment described above, the two pairs of sensors 14a and 14b are disposed outside of the annular ring 12. Using this approach, the two pair of sensors 14a and 14b may be adapted to measure the distance from an outside surface 26 of the annular ring 12. In another embodiment of an angular position measurement device 30 shown in FIG. 2A, two pairs of sensors 34a and 34b may be disposed inside of the annular ring 32. In this embodiment, the two pairs of sensors 34a and 34b have a generally similar structure and purpose to the two pairs of sensors 14a and 14b of FIGS. 1A and 1B.

The annular ring 32 is also similar in structure and purpose to the annular ring 12 of FIGS. 1A and 1B.

Figure 2A:
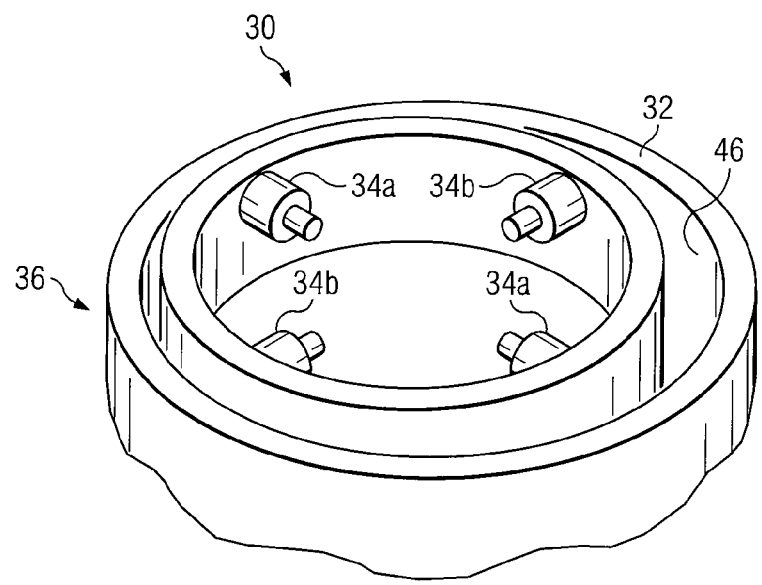
FIG. 2A is a partial perspective view of another rotatable structure and an angular position measurement device according to the teachings of the invention disposed on the rotatable structure.

The annular ring 32 of FIGS. 2A differs however in that the two pairs of sensors 34a and 34b are configured to measure the distance from an inside surface 46 of the annular ring 32. In one embodiment, the annular ring 32 may form a portion of a rotatable structure 36.

Figure 2B:
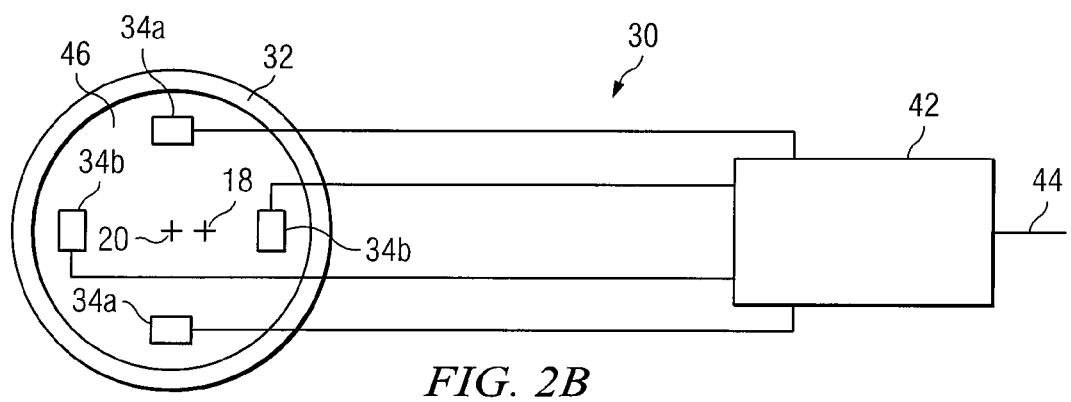
FIG. 2B is a schematic diagram of the embodiment of FIG. 2A showing additional details of a sensor transducing circuit that is electrically coupled to the sensors.
Figure 2C:
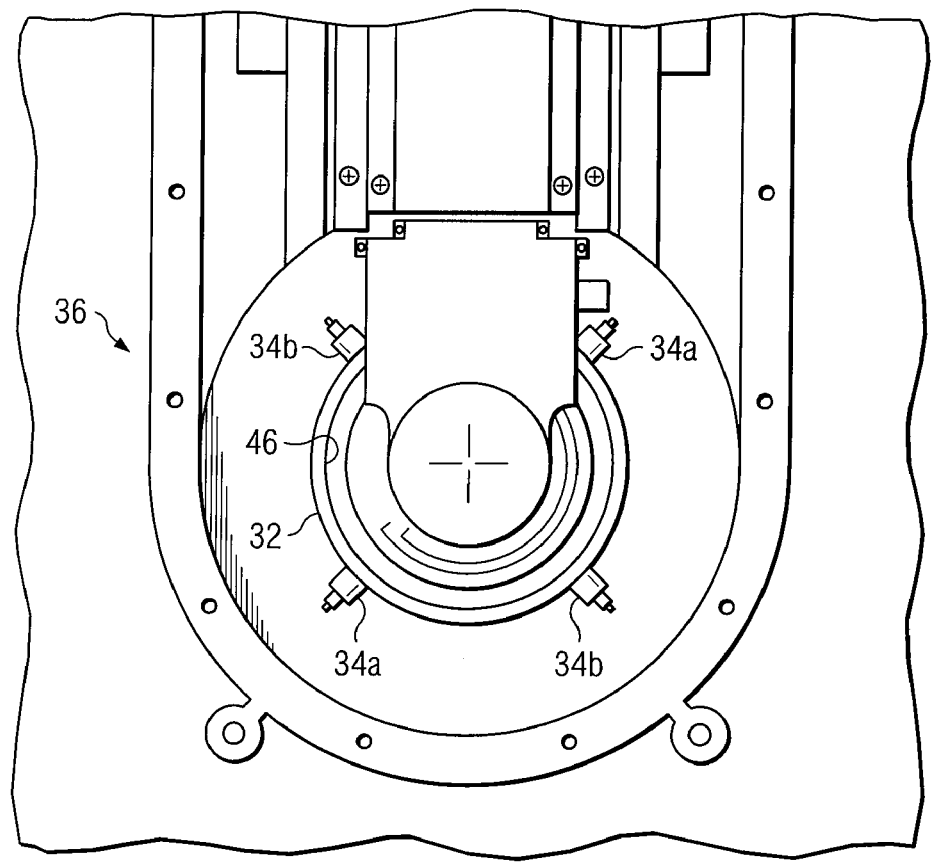
FIG. 2C is a partial perspective view is a partial perspective view of the angular position measurement device of FIG. 2A that is configured on one embodiment of a rotatable structure that is an electro optical/infrared sensor.

In one embodiment, the angular position measurement device 30 may be implemented on a rotatable structure 36 that may be a gimbal assembly as shown in FIG. 2C. In another embodiment, the rotatable structure 36 may be used in conjunction with an electro optical/infrared sensor. In this particular embodiment, the rotatable structure 36 as shown may be suited for implementation on the elevational axis of the gimbal assembly.

A schematic diagram of the angular position measurement device 30 of FIG. 2A is shown in FIG. 2B. The angular position measurement device 30 also has sensor transducing circuit 42 for combining the measured signals from each of the sensors 34a and 34b into a single signal 44 that accurately indicates the angular position of the annular ring 32 in a similar manner to the sensor transducing circuit 22 of the embodiment of FIGS. 1A and 1B. Because the embodiment of FIGS. 2A and 2B function in a generally similar manner to the embodiment of FIGS. 1A and 1B, further description of the various embodiments will continue with regard to the embodiment of FIGS. 1A and 1B only.

Figure 3:
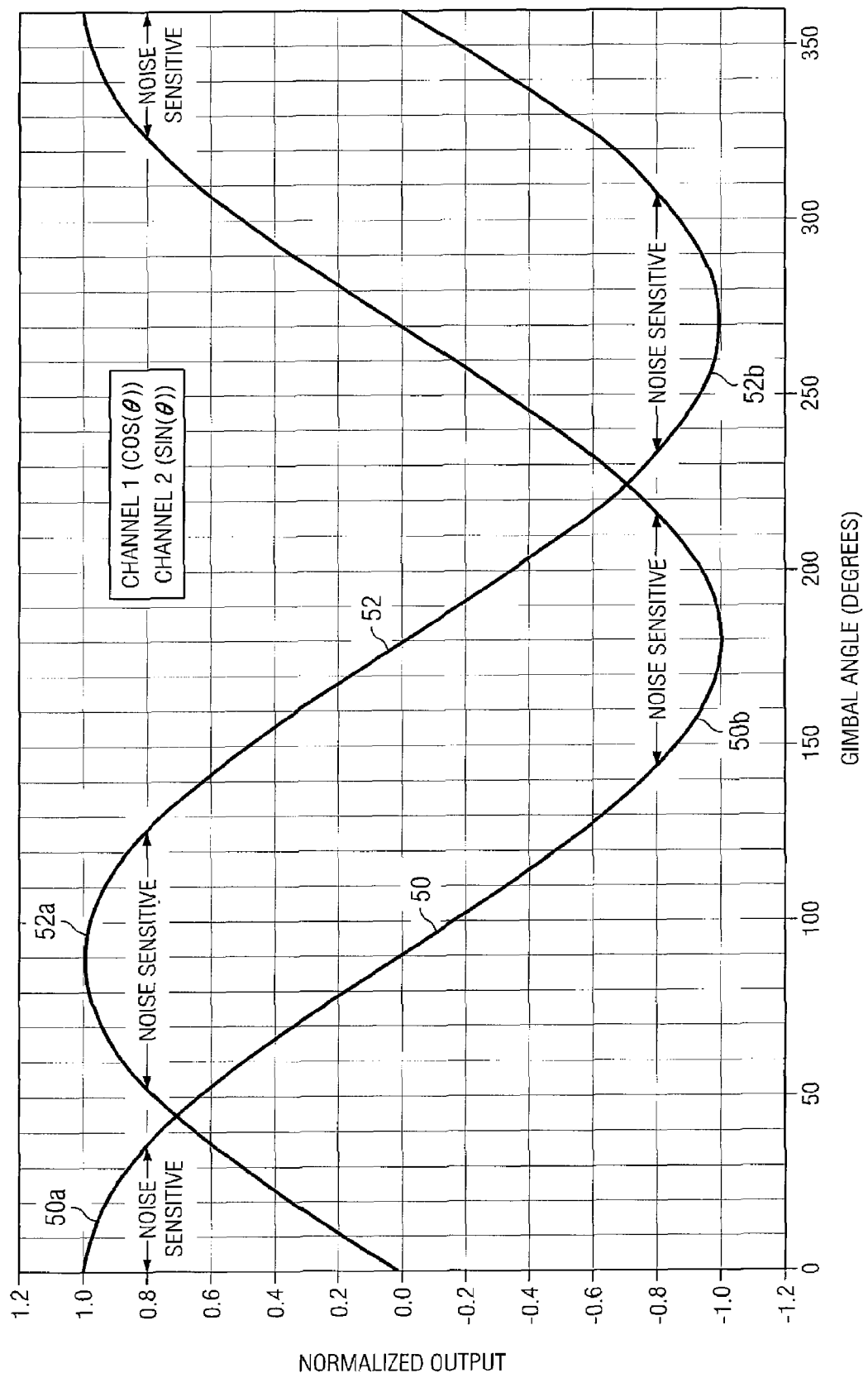
FIG. 3 is a graphical representation of the waveforms that may be produced by the sensors of the embodiment of FIG. 1.

A graphical representation showing the output level $OL_1$ of the first pair of sensors 14a and the output level $OL_2$ of the second pair of sensors 14b as the annular ring rotates about the shaft axis 18 is shown in FIG. 3. Waveform 50 shows the instantaneous output level $OL_1$ that may be produced by the first pair of sensors 14a as the annular ring 12 rotates 360 degrees about the shaft axis 18. Waveform 52 shows the instantaneous output level $OL_2$ that may be produced by the second pair of sensors 14b as the annular ring 12 rotates 360 degrees about the shaft axis 18. Because each of the pair of sensors 14a and 14b are positioned approximately 90 degrees apart, waveform 52 may be displaced from waveform 50 by approximately 90 degrees.

The sensor transducing circuit 22 may be operable to resolve the angular position of the annular ring 12 to any angular position within a 360 degree radius. In one embodiment, sensor transducing circuit 22 may include a microprocessor circuit that is operable to execute instructions stored in a memory. To resolve the angular position of the annular ring 12 to any angular position, the sensor transducing circuit 22 may receive measurements from the first and second pair of sensors 14a and 14b and combine these measurements using the following computer implemented algorithm in the sensor transducing circuit:

IF $OL_1>0$ AND $OL_2>0$ $\Theta_2$=ARCCOS(OL$_2$)

ELSE

ELSEIF OL$_1$<0 AND OL$_2$>0

$\Theta_1$=ARCCOS(OL$_1$)

$\Theta_2$=180−ARCCOS(OL$_2$)

ELSE

ELSEIF OL$_1$<0 AND OL$_2$<0

$\Theta_1$=360−ARCCOS(OL$_1$)

$\Theta_2$=180−ARCCOS(OL$_2$)

ELSE

ELSEIF OL$_1$>0 AND OL$_2$<0

$\Theta_1$=360−ARCCOS(OL$_1$)

$\Theta_2$=360−ARCCOS(OL$_2$)

ENDIF $\Theta_1$ refers to an angular position measurement calculated by the sensor transducing circuit 22 based upon the first pair of sensors 14a. $\Theta_2$ refers to an angular position measurement calculated by the sensor transducing circuit 22 based upon the second pair of sensors 14b. The sensor transducing circuit 22 may combine the output levels of each pair of sensors 14a and 14b using any suitable means to resolve the angular position of the annular ring 12 within a 360 degree radius. In one embodiment, the output levels OL1 and OL2 of both waveforms 50 and 52 has been normalized to be between 1 and −1. Therefore, the algorithm as shown above may be able to resolve the angular position of the annular ring 12 within any quadrant based upon the combined polarity of measurements taken.

Waveform 50 has a relative maximum peak region 50a and a relative minimum peak region 50b. Additionally, waveform 52 has a relative maximum peak region 52a and a relative minimum peak region 52b. Within either of these peak regions 50a, 50b, 52a, and 52b, a relatively large angular displacement occurs for a relatively small change in output level of its associated sensor 14. Thus, when operating independently of each other, each pair of sensors 14a or 14b may provide a signal level that may have reduced accuracy at angular positions in which the sensor 14 is at a relative peak level. Certain embodiments of the present invention may provide enhanced accuracy to measurements taken when the angular position of the annular ring 12 is within any of these peak regions 50a, 50b, 52a, and 52b by combining the measurement data from each pair of sensors 14a and 14b using a weighting factor. That is, the sensor transducing circuit 22 may be configured to combine measurements from both pairs of sensors 14a and 14b such that measurements from any particular pair of sensors 14 are more lightly weighted when the annular ring 12 is within the peak region of that particular pair of sensors 14a or 14b. In one embodiment, the weighting factor may be configured to heavily weight measurements taken from the first pair of sensors 14a except when the first pair of sensors 14a is proximate a relative peak level 50a or 50b. In this particular embodiment, if the first pair of sensors 14a is proximate one of the relative peak levels 50a or 50b, the sensor transducing circuit 22 may then be operable to more heavily weight measurements from the second pair of sensors 14b. Thus, the weighting factor may be proportionally applied to measurements taken from the sensors 14a and 14b. That is, the weighting factor may be increasingly applied to the second pair of sensors 14b as the angular position of the first pair of sensors 14a approaches the relative peak level 50a or 50b. In one embodiment, the weighting factor may be an executable algorithm that is executed by the sensor transducing circuit 22. In this particular embodiment, the executable algorithm that is used to calculate the output signal 24 may be:

Angular position=$\Theta_1$+($\Theta_2$−$\Theta_1$)*ABS(COS($\Theta_1$))

The portion of the above algorithm, namely "($\Theta_2$−$\Theta_1$)*ABS(COS($\Theta_1$))" may be referred to as a weighting factor. Thus, if the output level OL$_1$ of the first pair of sensors 14a is not proximate a relative maximum output level, then the angular position measurement output by the system is predominantly given by $\Theta_1$. However, as the angular position of the annular ring 12 approaches one of the relative maximum output levels 50a or 50b, the weighting factor increasingly weights the output level of $\Theta_2$ to the angular position measurement value outputted on output signal 24. This formula may be stored in the memory of sensor transducing circuit 22 as an algorithm that continually calculates the angular position based upon output level measurements taken by the sensor transducing circuit 22. Thus, certain embodiments of the present invention may provide a non-contact angular position measurement system that maintains a relatively high degree of accuracy throughout 360 degrees of movement of its shaft.

Figure 4:
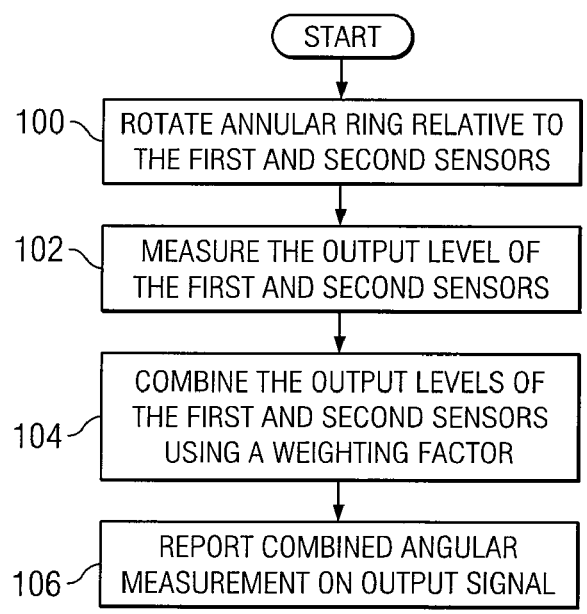
FIG. 4 is a flowchart showing a sequence of acts that may be used to implement a method for operating the embodiment of FIG. 1.

FIG. 4 shows a sequence of acts that may be utilized to implement a method for operating the angular position measurement device of FIGS. 1A and 1B. In act 100, the annular ring 12 may be rotated relative to the first and second sensors 14a and 14b by rotating the shaft relative to the rotatable structure 16. This rotation may be continuous or momentary. That is, the shaft may rotate continuously in a manner similar to a motor that delivers rotational power to a load. Momentary rotation on the other hand, may refer to rotational movement of rotational structures that are adapted to provide static angular positioning of the shaft relative to the rotational structure, such as, for example, gimbal joints, hinges, and the like. During rotation of the annular ring 12, the output level OL$_1$ and OL$_2$ of each of the sensors 14a and 14b may be measured in act 102.

The output levels of both sensors are then combined using the sensor transducing circuit 22 at act 104. As mentioned previously, the act of combining the output levels may incorporate a weighting factor that increases the weighting of a particular output level that is not proximate a relative peak value. In one embodiment, angular measurements are taken from a first sensor 14a and the output level of the second sensor 14b is increasingly weighted as the output level of the first sensor 14a approaches an relative peak value. In this manner, no abrupt changes in measurements are incurred as the annular ring 12 rotates through its full range of motion. In act 106, the combined angular measurement may then be reported on output signal 24 or 44.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A gimbal assembly for measuring an angular position of a rotatable structure comprising:

a gimbal having a rotatable joint portion;

an annular ring that is eccentrically rotatable about an axis of the rotatable joint portion;

a first and second pair of eddy current sensors being rotatable relative to the annular ring and disposed a predetermined distance from the axis such that the first and second eddy current sensors have a first and second output level, respectively, that is proportional to the angular position of the annular ring, the first pair of eddy current sensors being disposed approximately 90 degrees from the second pair of eddy current sensors, each eddy current sensor of each pair of eddy current sensors being disposed approximately 180 degrees from one another, the annular ring having a surface that faces toward the first and second eddy current sensors, the surface being essentially smooth in contour; and a sensor transducing circuit operable to proportionally combine the first and second output levels into an output signal based upon a weighting factor, the weighting factor being proportional to an absolute value of the first output level such that the sensor transducing circuit is configured to increase the weighting of the second output level as the absolute value of the first output level approaches a relative peak value.

2. The gimbal assembly of claim 1, wherein the first and second sensors are operable to provide an output level that is generally continuous over the angular range of the annular ring.

3. The gimbal assembly of claim 1, wherein the first and second sensors are disposed outside of the annular ring.

4. The gimbal assembly of claim 1, wherein the first and second sensors are disposed inside of the annular ring.

5. A sensor assembly for measuring an angular position of a rotatable structure comprising:

an annular ring that is eccentrically rotatable about an axis;

a first and second sensors being rotatable relative to the annular ring and disposed a predetermined distance from the axis such that the first and second sensors have a first and second output level, respectively, that is proportional to the angular position of the annular ring, the first and second sensors being disposed a predetermined radial distance from one another;

a sensor transducing circuit operable to proportionally combine the first and second output levels into an output signal based upon a weighting factor, the weighting factor being proportional to an angular position of at least one of the first and second sensors relative to the annular ring, wherein the weighting factor is proportional to an absolute value of the first output level such that the sensor transducing circuit is configured to increase the weighting of the second output level as the absolute value of the first output level approaches a relative peak value.

6. The gimbal assembly of claim 5, wherein the first and second sensors are eddy current proximity sensors.

7. The gimbal assembly of claim 6, wherein the first and second pair of eddy current sensors do not contact the annular ring.

8. The sensor assembly of claim 5, wherein the rotatable structure is a rotatable joint portion of a gimbal.

9. The sensor assembly of claim 5, wherein the weighting factor is continuous over the angular range of the annular ring.

10. The sensor assembly of claim 5, wherein the predetermined radial distance is approximately 90 degrees.

11. The sensor assembly of claim 5, wherein the first and second sensors each comprise a pair of sensors, each of the pair of sensors are disposed approximately 180 degrees from each other around the shaft axis.

12. The sensor assembly of claim 5, wherein the first and second sensors are disposed outside of the annular ring.

13. The sensor assembly of claim 5, wherein the first and second sensors are disposed inside of the annular ring.

14. The sensor assembly of claim 5, wherein the annular ring has a surface that faces toward the first and second sensors, the surface being essentially smooth in contour.

15. The sensor assembly of claim 14, wherein the first and second sensors are operable to provide an output level that is generally continuous over the angular range of the annular ring.

16. A method comprising:

eccentrically rotating an annular ring about an axis;

measuring a first output level and a second output level from first and second sensors respectively, the first and second sensors being disposed a predetermined distance from the axis such that the first and second output levels are indicative of the distance of the first and second sensors from the annular ring, respectively, the first and second sensors being disposed a predetermined radial distance from one another; and combining the first and second output levels using a weighting factor, the weighting factor being proportional to an absolute value of the first output level such that the second output level is more heavily weighted than the first output level as the absolute value of the first output level approaches a relative peak value.

17. The method of claim 16, wherein the annular ring has a surface that faces toward the first and second sensors, the surface being essentially smooth in contour.

18. The method of claim 16, wherein combining the first and second output levels using a weighting factor comprises combining the first and second output levels using a weighting factor that is continuous over the angular range of the annular ring relative to the first and second sensors.

19. The method of claim 16, wherein eccentrically rotating an annular ring comprises eccentrically rotating the annular ring around a rotatable joint portion of a gimbal.

* * * * *

UNITED STATES PATENT AND TRADEMARK OFFICE
CERTIFICATE OF CORRECTION

PATENT NO.         : 7,550,965 B2                                     Page 1 of 1
APPLICATION NO. : 11/559597
DATED              : June 23, 2009
INVENTOR(S)       : Kirk A. Miller It is certified that error appears in the above-identified patent and that said Letters Patent is hereby corrected as shown below:

Column 5, Line 1
Insert -- $\Theta_1 = ARCCOS(OL_1)$ --.

Signed and Sealed this

Thirteenth Day of October, 2009

David J. Kappos
*Director of the United States Patent and Trademark Office*